June 6, 1961 E. C. PARK, JR 2,987,631
ELECTRICAL SIGNAL COUPLING CIRCUIT
Filed July 14, 1958

Inventor
Edward C. Park, Jr.
by Roberts, Cushman & Grover
Attys

United States Patent Office 2,987,631
Patented June 6, 1961

2,987,631
ELECTRICAL SIGNAL COUPLING CIRCUIT
Edward C. Park, Jr., Salem, Mass., assignor to Arthur D. Little, Inc., Cambridge, Mass., a corporation of Massachusetts
Filed July 14, 1958, Ser. No. 748,222
14 Claims. (Cl. 307—88.5)

This invention relates to coupling or transmitting an electrical signal between two circuits and particularly to a superconductive circuit for transmitting alternating and direct current signals.

Direct current signals may vary in amplitude, like alternating current signals, but do not ordinarily vary in polarity, and may be of such low frequency that they are not transmitted by conventional alternating current coupling devices such as transformers and capacitors. Thus D.C. signals conventionally are coupled by direct connection between circuits, making it difficult to isolate the circuits.

Accordingly an object of the present invention is to provide a coupling circuit capable of transmitting D.C. and A.C. signals, and signals having D.C. and A.C. components, which circuit indirectly couples the other external circuits and hence isolates the external circuits from each other.

According to the invention an electrical signal transmission circuit comprises a primary inductance, a secondary inductance coupled thereto, and inductive output means in series with said secondary, said secondary and output means forming a closed, wholly superconductive secondary circuit, said secondary circuit carrying current of amplitude proportional to current in said primary, and means responsive to variations in amplitude of current in said output means.

Superconductors, or superconductive materials, have the capability of assuming a superconducting or zero resistance state as described in "The Cryotron," D. A. Buck, Proc. I.R.E., April 1956. Metals such as lead, tantalum and iobium, when cooled in a bath of liquid helium at 4.2° K. become superconducting in the absence of a predetermined magnetic field. The secondary circuit of the present invention in its superconducting state has zero resistance to current induced by the aforementioned primary inductance. Hence a change in amplitude in the direct current in the primary will induce a corresponding change in the direct current in the secondary, and the induced direct current will continue at the same amplitude if current in the primary does not change.

Figure 1:
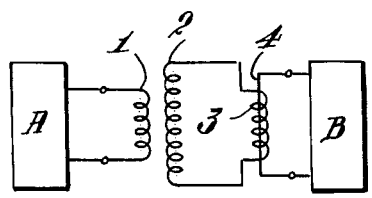
Figure 2:
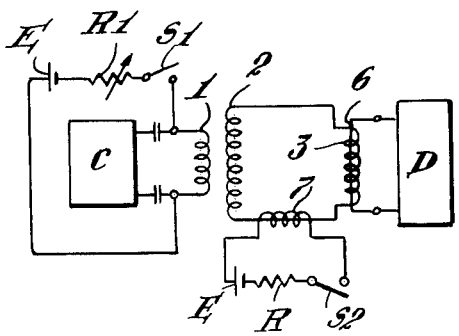
Figure 3A:
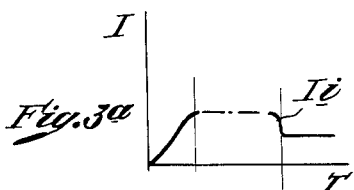
Figure 3B:
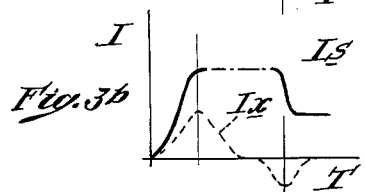
Figure 4A:
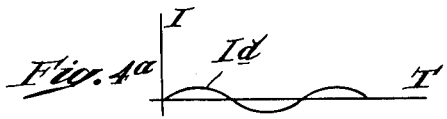
Figure 4B:
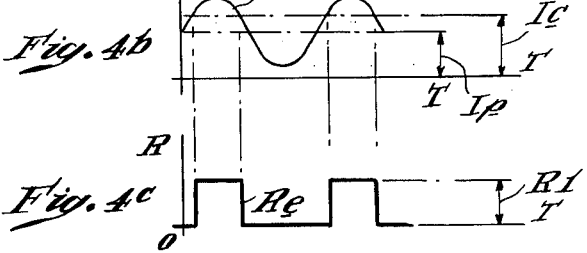
Figure 4C:
Figure 5:
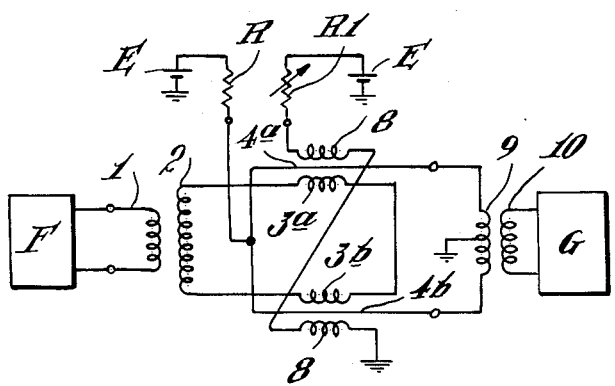

Typical embodiments of the above-described coupling principle are illustrated in the accompanying drawings in which:

FIG. 1 is a schematic diagram of a coupling circuit;
FIG. 2 is a schematic diagram of another form of coupling circuit;
FIGS. 3a and 3b are plots of currents in the circuit of FIG. 1;
FIGS. 4a, 4b and 4c are plots of currents and resistance in the circuit of FIG. 2; and
FIG. 5 is still another form of coupling circuit.

As shown schematically in FIG. 1, a simple coupling circuit comprises a transformer primary coil 1 directly connected to a first external circuit A, and a secondary coil 2 forming a closed loop with an inductive output coil 3. The primary coil 1 may be, but need not be, a superconductive material such as lead, niobium or tantalum. The closed loop formed by the secondary coil 2 and output coil 3 is formed wholly of a superconductive material such as niobium. A magnetic field responsive device 4 is disposed in the magnetic field of the output coil 3. Suitable devices are a magneto-resistive bismuth wire or a tantalum cryotron gate such as is described in the article by D. A. Buck. The device is shown directly connected to another external circuit B.

Operation of the circuit of FIG. 1 is illustrated by the current plots of FIGS. 3a and 3b. FIG. 3a shows the variations in D.C. level of an input signal $Ii$ to the primary 1, current I variations being plotted against time T. The signal $Ii$ rises from zero to a higher level, then drops to an intermediate level. Simultaneously, as shown in FIG. 3b, the current $Is$ in the secondary follows proportionately and with amplification the primary current changes. In previously known transformers the secondary current would generally follow the dotted line curve $Ix$, rising from and returning to zero according to the rate of change of the D.C. input level. However, in the present secondary, what might be called a circulating current is established in the secondary loop 2, 3, and this circulating current continues at a level proportional to the input level, even though the input is a true, direct current having a steady value. The steady, circulating, secondary current flows through the output coil 3 applying a magnetic field to the device 4. If the device 4 is a magneto-resistive bismuth wire, its resistance will vary as does the field amplitude. If the device 4 is a superconducting gate, the gate may be changed from zero to a finite but limited value of resistance when the field of coil 3 exceeds a predetermined value. In either case a D.C. signal has been coupled between external circuits A and B without direct connection.

FIG. 2 illustrates a type of circuit which may be used for indirect transmission of an unvarying D.C. signal. Its operation is illustrated by the curves of FIGS. 4a, 4b and 4c. An A.C. signal source C applies an A.C. signal $Id$ (FIG. 4a) to the primary 1 which is coupled to the secondary 2 in the above-described wholly superconductive secondary circuit 2, 3, formed for example of 0.003 inch diameter niobium wire. The output coil 3 applies a field to a superconductive gate 6 directly connected to an external circuit D.

The A.C. signal in the secondary circuit 2, 3 is superimposed on a steady, unvarying D.C. signal which is established as follows. In parallel with the A.C. source C is an adjustable constant current source E, $Rl$ comprising a voltage source E and a relatively high variable resistance $Rl$. When a switch S1 completes or breaks a connection between the current source, E, $Rl$ and the primary 1 a current is induced in the secondary circuit 2, 3. This current may be quenched by supplying to a 0.009 inch diameter, 100 turn control coil 7 a current which applies to a portion of the secondary circuit a field in excess of the critical field, as described in the article by D. A. Buck. Such a current may be applied by means of a constant current source E, R and a switch S2.

One sequence for establishing a persistent current in the secondary circuit is as follows. Switch S2 is closed causing the control coil 7 to quench, or make resistive, the secondary circuit. If switch S1 is then closed only a momentary current will be induced in the secondary 2, although a steady field exists in the primary coil 1. Now, if switches S2 and S1 are successively opened, first the secondary circuit will become superconductive, and then the collapsing field in the primary 1 will induce a change in current in the secondary from a zero level to a level $Ip$ (FIG. 4b) proportional to the previous D.C. level in the primary. Thus at the D.C. level $Ip$ a persistent current remains although the primary D.C. current is no longer supplied through the switch S1.

After establishment of the persistent current, the A.C. signal $Id$ from the source D will induce in the secondary circuit an amplified signal $Is'$ which alternates about the persistent current level $Ip$. The composite signal which has the D.C. component Ip and A.C. component Is' will apply a corresponding varying magnetic field to the superconductive gate 6. As shown in FIG. 4b the A.C. signal Is' alternates above a critical current value Ic, sufficiently to render the gate 6 resistive. As the A.C. signal rises above critical value the gate rises abruptly to its limited resistance Rl. As shown in FIG. 4, the resistance (R) versus time (T) curve Re is a series of square wave pulses as a result of the chopping action of the gate 6. Since the field applied to the gate is held close to the critical level Ic by the persistent current component Ip, the speed and linearity of the gate response is high.

In FIG. 5 is shown a coupling circuit suitable for use with a novel amplifier circuit which, per se, is not claimed in this application. The amplifier circuit comprises two parallel gate wires 4a and 4b connected to the previously described constant current supply E, R, and feeding an output transformer 9, 10 whose primary 9 is center-tapped to ground and whose secondary 10 feeds circuit G. The gates 4a and 4b are biased by coils 8 connected in series with an adjustable current source comprising a voltage supply E and an adjustable resistance Rl, like that of FIG. 2. The current level of the source E, Rl is adjusted so that the gates 4a and 4b are held by the steady field of the bias coils in a transition range intermediate their zero resistance and limited resistance value. A.C. signals in coils 3a and 3b superimpose a varying field on the gates which adds to the steady field on one gate and subtracts from the field on the other. The resistances of the respective gates 4a and 4b then swing in opposite directions, and the current through the coils varies inversely, so that at any instant, current in one half of the output primary 9 is flowing to ground, and in the other half is flowing from ground, at an amplitude proportional to the A.C. signal in the coils 3a and 3b.

According to the present invention the A.C. signal is supplied to the coils 3a by forming them in a closed wholly superconductive loop with the secondary 2 of the previously described transformer 1, 2. The input A.C. signal from a suitable source F induces an amplified current in the secondary coil 2 of the wholly superconductive secondary circuit 2, 3a, 3b. In a conventional, resistive secondary circuit, the induced current would be proportional to the rate of change of primary current, as shown by the dotted line curve Ix of Fig. 3b. However, in the present secondary circuit current variations are proportional to primary current variations, and hence, the field applied to the gates 4a and 4b, and the output current in transformer primary 9 are faithful reproductions of the input signal.

In each of the above-described circuits it is seen that current signals are advantageously coupled between external circuits without direct connection but with faithful transmission of the variations in the input signal. The input circuit is isolated from the output circuit as to voltage and current levels, but signals having D.C. components may be coupled to an external circuit, with or without amplification.

It should be understood that the present disclosure is for the purpose of illustration only, and that this invention includes various modifications and equivalents falling within the scope of the appended claims. For example magneto-responsive output means other than the bismuth and superconductive gates of FIGS. 1 and 2, or the transformer of FIG. 5 may be used. Bias current may be applied to the secondary circuit of FIG. 5 by presistent current established in coils 3a and 3b by the sequence described with respect to FIGS. 3 and 4a, 4b and 4c.

I claim:

1. An electrical circuit for transmitting variations in current amplitude comprising a primary inductance, a secondary inductance inductively coupled thereto, and inductive output means in series with said secondary inductance, said secondary inductance and output means forming a closed, secondary circuit wholly of superconductive material, having a critical temperature transition characteristic and being adapted to be maintained in an environment below said temperature transition characteristic so that said secondary circuit can exist in a superconducting, zero resistance state, said secondary circuit being capable of carrying current of amplitude proportional to current in said primary inductance, and means responsive to variations in amplitude of current in said output means.

2. A circuit according to claim 1 in combination with input means connected to said primary inductance for establishing a direct current in said secondary circuit.

3. A circuit according to claim 1 in combination with means for establishing a persistent current in said secondary circuit.

4. A circuit according to claim 1 in combination with means for applying a direct current to said primary inductance, and means for superimposing an alternating current signal thereupon.

5. A circuit according to claim 4 wherein said direct current applying means is adapted to establish a persistent current in said secondary circuit.

6. A circuit according to claim 1 in combination with means for quenching the secondary circuit.

7. A circuit according to claim 5 in combination with means for quenching the secondary circuit.

8. A circuit according to claim 5 wherein said direct current applying means comprises an interruptable source of direct current connected to said primary inductance.

9. A circuit according to claim 1 in combination with magneto-responsive means in the field of said output means.

10. A circuit according to claim 9 wherein said responsive means comprises a superconductive gate.

11. A circuit according to claim 9 wherein said responsive means comprises a magneto-resistive element.

12. A circuit according to claim 9 wherein said responsive means comprises a secondary transformer coil.

13. A circuit according to claim 1 wherein said output means comprises two magnetic field inducing means, and said responsive means comprises two superconductive means connected in parallel and disposed in the field of said inducing means respectively.

14. A circuit according to claim 13 in combination with means for establishing a persistent current through said inducing means.

References Cited in the file of this patent

UNITED STATES PATENTS 2,832,897    Buck _____ Apr. 29, 1958
2,949,602    Crowe _____ Aug. 16, 1960

OTHER REFERENCES

Slade et al.: A Review of Superconductive Switching Circuits. Proceedings: National Electronic Conference, pp. 574–581, March 1958.